(12) United States Patent
Panda et al.

(10) Patent No.: US 7,966,645 B2
(45) Date of Patent: Jun. 21, 2011

(54) APPLICATION-AWARE POLICY ENFORCEMENT

(75) Inventors: Biswaranjan Panda, Sunnyvale, CA (US); Flemming S. Andreasen, Marlboro, NJ (US); Jonathan D. Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 982 days.

(21) Appl. No.: 11/715,187

(22) Filed: Mar. 6, 2007

(65) Prior Publication Data

US 2007/0220588 A1 Sep. 20, 2007

Related U.S. Application Data

(60) Provisional application No. 60/780,176, filed on Mar. 6, 2006.

(51) Int. Cl.
*H04L 9/00* (2006.01)
(52) U.S. Cl. .......................................................... 726/1
(58) Field of Classification Search ................ 726/1, 13; 370/229
See application file for complete search history.

(56) References Cited

U.S. PATENT DOCUMENTS

| | | | |
|---|---|---|---|
| 5,602,907 A | 2/1997 | Hata et al. | 379/114 |
| 5,822,411 A | 10/1998 | Swale et al. | 379/111 |
| 5,828,737 A | 10/1998 | Sawyer | 379/114 |
| 5,905,736 A | 5/1999 | Ronen et al. | 370/546 |
| 5,909,238 A | 6/1999 | Nagashima et al. | 348/3 |
| 5,946,670 A | 8/1999 | Motohashi et al. | 705/400 |
| 5,956,391 A | 9/1999 | Melen et al. | 379/114 |
| 5,970,477 A | 10/1999 | Roden | 705/32 |
| 5,987,498 A | 11/1999 | Athing et al. | 709/203 |
| 6,016,509 A | 1/2000 | Dedrick | 709/224 |
| 6,035,281 A | 3/2000 | Crosskey et al. | 705/14 |
| 6,047,051 A | 4/2000 | Ginzboorg et al. | 379/130 |
| 6,070,192 A | 5/2000 | Holt et al. | 709/227 |

(Continued)

FOREIGN PATENT DOCUMENTS

WO WO 98/26381 12/1997

(Continued)

OTHER PUBLICATIONS

Draft—TR45—PN-3-4732-RV4 (to be published as TIA-835.1-D), 32 pages.

(Continued)

*Primary Examiner* — Ellen Tran
(74) *Attorney, Agent, or Firm* — Baker Botts L.L.P.

(57) ABSTRACT

In one embodiment, a method includes receiving a first message from a first manager. The first message includes a first element of a request for policy authorization. The request for policy authorization attempts to reserve particular network resources for a particular application context. The method includes, in response to the first message, establishing a policy rendezvous state at a policy manager for a policy decision on the request for policy authorization. The method includes receiving a second message from a second manager subsequent to the first message. The second message includes a second element of the request for policy authorization, and the second element completes the request for policy authorization. The method includes, in response to the second message, making the policy decision based on the first and second elements of the request for policy authorization. The method includes, if the policy decision grants the request for policy authorization, generating a complete policy facet and communicating the complete policy facet to the first manager or the second manager to authorize use of the particular resources for the particular application context.

24 Claims, 2 Drawing Sheets

U.S. PATENT DOCUMENTS

| | | | |
|---|---|---|---|
| 6,075,854 A | 6/2000 | Copley et al. | 379/211 |
| 6,131,024 A | 10/2000 | Boltz | 455/405 |
| 6,137,791 A | 10/2000 | Frid et al. | 370/352 |
| 6,141,684 A | 10/2000 | McDonald et al. | 709/222 |
| 6,175,879 B1 | 1/2001 | Shah et al. | 709/330 |
| 6,208,977 B1 | 3/2001 | Hernandez et al. | 705/34 |
| 6,229,887 B1 | 5/2001 | Albers et al. | 379/219 |
| 6,282,573 B1 | 8/2001 | Darago et al. | 709/229 |
| 6,295,447 B1 | 9/2001 | Reichelt et al. | 455/417 |
| 6,330,562 B1 | 12/2001 | Boden et al. | 707/10 |
| 6,332,163 B1 | 12/2001 | Bowman-Amuah | 709/231 |
| 6,339,832 B1 | 1/2002 | Bowman-Amuah | 714/35 |
| 6,434,568 B1 | 8/2002 | Bowman-Amuah | 707/103 R |
| 6,434,628 B1 | 8/2002 | Bowman-Amuah | 714/48 |
| 6,438,594 B1 | 8/2002 | Bowman-Amuah | 709/225 |
| 6,442,748 B1 | 8/2002 | Bowman-Amuah | 717/108 |
| 6,466,964 B1 | 10/2002 | Leung et al. | 709/202 |
| 6,477,580 B1 | 11/2002 | Bowman-Amuah | 709/231 |
| 6,477,665 B1 | 11/2002 | Bowman-Amuah | 714/39 |
| 6,480,485 B1 | 11/2002 | Kari et al. | 370/352 |
| 6,490,451 B1 | 12/2002 | Denman et al. | 455/436 |
| 6,493,547 B1 | 12/2002 | Raith | 455/405 |
| 6,496,850 B1 | 12/2002 | Bowman-Amuah | 709/203 |
| 6,502,213 B1 | 12/2002 | Bowman-Amuah | 714/49 |
| 6,510,513 B1 | 1/2003 | Danieli | 713/156 |
| 6,529,909 B1 | 3/2003 | Bowman-Amuah | 707/10 |
| 6,529,948 B1 | 3/2003 | Bowman-Amuah | 709/217 |
| 6,539,396 B1 | 3/2003 | Bowman-Amuah | 707/103 R |
| 6,549,949 B1 | 4/2003 | Bowman-Amuah | 709/236 |
| 6,550,057 B1 | 4/2003 | Bowman-Amuah | 717/126 |
| 6,571,282 B1 | 5/2003 | Bowman-Amuah | 709/219 |
| 6,578,068 B1 | 6/2003 | Bowman-Amuah | 709/203 |
| 6,601,192 B1 | 7/2003 | Bowman-Amuah | 714/38 |
| 6,601,234 B1 | 7/2003 | Bowman-Amuah | 717/108 |
| 6,606,660 B1 | 8/2003 | Bowman-Amuah | 709/227 |
| 6,611,821 B2 | 8/2003 | Stahl et al. | 705/400 |
| 6,615,199 B1 | 9/2003 | Bowman-Amuah | 706/50 |
| 6,615,253 B1 | 9/2003 | Bowman-Amuah | 709/219 |
| 6,615,263 B2 | 9/2003 | Dulai et al. | 709/225 |
| 6,621,820 B1 | 9/2003 | Williams et al. | 370/395.31 |
| 6,636,242 B2 | 10/2003 | Bowman-Amuah | 715/764 |
| 6,640,238 B1 | 10/2003 | Bowman-Amuah | 709/201 |
| 6,640,244 B1 | 10/2003 | Bowman-Amuah | 709/207 |
| 6,647,262 B1 | 11/2003 | Demetrescu et al. | 455/436 |
| 6,665,537 B1 | 12/2003 | Lioy | 455/435 |
| 6,665,718 B1 | 12/2003 | Chuah et al. | 709/225 |
| 6,671,675 B2 | 12/2003 | Iwamura | 705/30 |
| 6,684,243 B1 | 1/2004 | Euget et al. | 709/222 |
| 6,684,256 B1 | 1/2004 | Warrier et al. | 709/238 |
| 6,708,225 B1 | 3/2004 | Cho et al. | 709/317 |
| 6,714,515 B1 | 3/2004 | Marchand | 370/231 |
| 6,715,145 B1 | 3/2004 | Bowman-Amuah | 718/101 |
| 6,728,266 B1 | 4/2004 | Sabry et al. | 370/468 |
| 6,728,365 B1 | 4/2004 | Li et al. | 379/229 |
| 6,728,884 B1 | 4/2004 | Lim | 713/201 |
| 6,742,015 B1 | 5/2004 | Bowman-Amuah | 718/101 |
| 6,742,036 B1 | 5/2004 | Das et al. | 709/226 |
| 6,757,371 B2 | 6/2004 | Kim et al. | 379/114.22 |
| 6,760,444 B1 | 7/2004 | Leung | 380/270 |
| 6,768,726 B2 | 7/2004 | Dorenbosch et al. | 370/331 |
| 6,769,000 B1 | 7/2004 | Akhtar et al. | 707/103 R |
| 6,771,623 B2 | 8/2004 | Ton | 370/331 |
| 6,785,256 B2 | 8/2004 | O'Neill | 370/338 |
| 6,804,518 B2 | 10/2004 | Core et al. | 455/436 |
| 6,826,173 B1 | 11/2004 | Kung et al. | 370/352 |
| 6,829,709 B1 | 12/2004 | Acharya et al. | 713/160 |
| 6,834,341 B1 | 12/2004 | Bahl et al. | 713/156 |
| 6,839,338 B1 | 1/2005 | Amara et al. | 370/334 |
| 6,842,906 B1 | 1/2005 | Bowman-Amuah | 719/330 |
| 6,856,676 B1 | 2/2005 | Pirot et al. | 379/201.01 |
| 6,889,321 B1 | 5/2005 | Kung et al. | 713/153 |
| 6,907,501 B2 | 6/2005 | Tariq et al. | 711/118 |
| 6,910,074 B1 | 6/2005 | Amin et al. | 709/227 |
| 6,915,345 B1 | 7/2005 | Tummala et al. | 709/225 |
| 6,917,605 B2 | 7/2005 | Kakemizu et al. | 370/338 |
| 6,920,503 B1 | 7/2005 | Nanji et al. | 709/230 |
| 6,922,404 B1 | 7/2005 | Narayanan et al. | 370/338 |
| 6,925,160 B1 | 8/2005 | Stevens et al. | 379/121.05 |
| 6,947,401 B2 | 9/2005 | El-Malki et al. | 370/331 |
| 6,961,774 B1 | 11/2005 | Shannon et al. | 709/227 |
| 6,967,941 B2 | 11/2005 | Roy | 370/338 |
| 6,978,128 B1 | 12/2005 | Raman et al. | 455/414 |
| 6,980,802 B2 | 12/2005 | Jung | 455/436 |
| 6,980,962 B1 | 12/2005 | Arganbright et al. | 705/26 |
| 6,981,047 B2 | 12/2005 | Hanson et al. | 709/227 |
| 6,982,967 B1 | 1/2006 | Leung | 370/328 |
| 6,990,337 B2 | 1/2006 | O'Neill et al. | 455/422.1 |
| 6,993,333 B2 | 1/2006 | Laroia et al. | 455/436 |
| 7,003,294 B2 | 2/2006 | Singhai et al. | 455/435.1 |
| 7,020,697 B1 | 3/2006 | Goodman et al. | 709/223 |
| 7,024,687 B2 | 4/2006 | Chaudhuri et al. | 726/3 |
| 7,028,311 B2 | 4/2006 | Roach et al. | 719/328 |
| 7,039,027 B2 | 5/2006 | Bridgelall | 370/329 |
| 7,054,268 B1 | 5/2006 | Paranteinen et al. | 370/231 |
| 7,079,499 B1 | 7/2006 | Akhtar et al. | 370/310 |
| 7,082,301 B2 | 7/2006 | Jagadeesan et al. | 455/436 |
| 7,103,359 B1 | 9/2006 | Heinonen et al. | 455/436 |
| 7,127,234 B2 | 10/2006 | Ishii | 455/411 |
| 7,130,286 B2 | 10/2006 | Koodli et al. | 370/331 |
| 7,133,386 B2 | 11/2006 | Holur et al. | 370/331 |
| 7,151,758 B2 | 12/2006 | Kumaki et al. | 370/331 |
| 7,151,772 B1 | 12/2006 | Kalmanek et al. | 370/390 |
| 7,154,868 B1 | 12/2006 | Sharma et al. | 370/331 |
| 7,161,914 B2 | 1/2007 | Shoaib et al. | 370/331 |
| 7,171,555 B1 | 1/2007 | Salowey et al. | 713/156 |
| 7,184,418 B1 | 2/2007 | Baba et al. | 370/331 |
| 7,187,931 B2 | 3/2007 | Trossen | 455/440 |
| 7,190,793 B2 | 3/2007 | Hsu | 380/270 |
| 7,197,763 B2 | 3/2007 | Hsu | 726/4 |
| 7,212,821 B2 | 5/2007 | Laroia et al. | 455/437 |
| 7,230,951 B2 | 6/2007 | Mizell et al. | 370/401 |
| 7,233,583 B2 | 6/2007 | Asthana et al. | 370/332 |
| 7,251,733 B2 | 7/2007 | Haverinen et al. | 713/182 |
| 7,263,371 B2 | 8/2007 | Das et al. | 455/456.1 |
| 7,269,727 B1 | 9/2007 | Mukherjee et al. | 713/160 |
| 7,272,122 B2 | 9/2007 | Trossen et al. | 370/331 |
| 7,272,123 B2 | 9/2007 | Wall | 370/331 |
| 7,275,156 B2 | 9/2007 | Balfanz et al. | 713/168 |
| 7,389,106 B2 | 6/2008 | Dawson et al. | 455/406 |
| 2001/0023428 A1 | 9/2001 | Miyazaki et al. | 709/201 |
| 2002/0021681 A1 | 2/2002 | Madour | 370/331 |
| 2002/0023174 A1 | 2/2002 | Garrett et al. | 709/245 |
| 2002/0036982 A1 | 3/2002 | Chen | 370/230 |
| 2002/0059114 A1 | 5/2002 | Cockrill et al. | 705/27 |
| 2002/0091802 A1 | 7/2002 | Paul et al. | 709/220 |
| 2002/0138601 A1 | 9/2002 | Piponius et al. | 709/223 |
| 2002/0151312 A1 | 10/2002 | Rosemarijn Bos et al. | 455/452 |
| 2003/0021252 A1 | 1/2003 | Harper et al. | 370/338 |
| 2003/0039237 A1 | 2/2003 | Forslow | 370/352 |
| 2003/0154400 A1 | 8/2003 | Pirttimaa et al. | 713/201 |
| 2003/0187817 A1 | 10/2003 | Agrawal et al. | 707/1 |
| 2003/0217165 A1 | 11/2003 | Buch et al. | 709/229 |
| 2004/0114553 A1 | 6/2004 | Jiang et al. | 370/328 |
| 2004/0116117 A1* | 6/2004 | Ahvonen et al. | 455/432.3 |
| 2004/0162876 A1 | 8/2004 | Kohavi | 709/203 |
| 2004/0162892 A1 | 8/2004 | Hsu | 709/221 |
| 2004/0196821 A1 | 10/2004 | Haddad et al. | 370/349 |
| 2004/0210524 A1 | 10/2004 | Benenati et al. | 705/40 |
| 2004/0259562 A1 | 12/2004 | Madour | 455/452.2 |
| 2005/0002407 A1 | 1/2005 | Shaheen et al. | 370/401 |
| 2005/0025132 A1 | 2/2005 | Harper et al. | 370/352 |
| 2005/0130659 A1 | 6/2005 | Grech et al. | 455/436 |
| 2005/0149651 A1 | 7/2005 | Doak et al. | 710/52 |
| 2005/0176428 A1 | 8/2005 | Gabor et al. | 455/435.1 |
| 2005/0195766 A1 | 9/2005 | Nasielski et al. | 370/331 |
| 2005/0201324 A1 | 9/2005 | Zheng | 370/328 |
| 2005/0213606 A1 | 9/2005 | Huang et al. | 370/467 |
| 2005/0220039 A1 | 10/2005 | Hoshino et al. | 370/261 |
| 2005/0278420 A1 | 12/2005 | Hartikainen et al. | 709/203 |
| 2005/0286709 A1 | 12/2005 | Horton et al. | 379/265.09 |
| 2006/0014547 A1 | 1/2006 | Walter | 455/456.1 |
| 2006/0018272 A1 | 1/2006 | Mutikainen et al. | 370/328 |
| 2006/0077924 A1 | 4/2006 | Rune | 370/328 |
| 2006/0080428 A1* | 4/2006 | Trossen et al. | 709/224 |
| 2006/0116113 A1 | 6/2006 | Gass | 455/414.4 |
| 2006/0126630 A1 | 6/2006 | Shirazipour et al. | 370/392 |
| 2006/0171310 A1 | 8/2006 | Ahluwalia et al. | 370/229 |

| | | | | |
|---|---|---|---|---|
| 2006/0251038 | A1 | 11/2006 | Tamura et al. | 370/342 |
| 2006/0264207 | A1 | 11/2006 | Tamura et al. | 455/415 |
| 2006/0268819 | A1 | 11/2006 | Chen et al. | 370/349 |
| 2007/0008882 | A1 | 1/2007 | Oran | 370/229 |
| 2007/0036312 | A1 | 2/2007 | Cai et al. | 379/126 |
| 2007/0086582 | A1 | 4/2007 | Tai et al. | 379/114.01 |
| 2007/0089161 | A1* | 4/2007 | Waris | 726/1 |
| 2007/0094712 | A1 | 4/2007 | Gibbs et al. | 726/3 |
| 2007/0121615 | A1 | 5/2007 | Weill et al. | 370/389 |
| 2007/0121642 | A1 | 5/2007 | Battin et al. | 370/395.2 |
| 2007/0153720 | A1 | 7/2007 | Baglin et al. | 370/328 |
| 2007/0254661 | A1 | 11/2007 | Chowdhury | 455/436 |

FOREIGN PATENT DOCUMENTS

| | | |
|---|---|---|
| WO | WO 99/31610 | 12/1998 |
| WO | WO 2005/107297 | 11/2005 |

OTHER PUBLICATIONS

Draft—TR45—PN-3-4732-RV4 (to be published as TIA-835.2-D), 93 pages.

Draft—TR45—PN-3-4732-RV4 (to be published as TIA-835.3-D), 36 pages

Draft—TR45—PN-3-4732-RV4 (to be published as TIA-835.4-D), 70 pages.

Draft—TR45—PN-3-4732-RV4 (to be published as TIA-835.5-D), 72 pages.

Draft—TR45—PN-3-4732-RV4 (to be published as TIA-835.6-D), 36 pages.

3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.

3GPP2 X.S0011-001-D, 3rd Generation Partnership Project 2 '3GPP2', "cdma2000 Wireless IP Network Standard: Introduction," Version 1.0, 33 pages, Feb. 2006.

3GPP2 C.S0063-0, 3rd Generation Partnership Project 2 '3GPP2', "cdma2000 High Rate Packet Data Supplemental," Version 1.0, 127 pages, Mar. 2006.

3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 257 pages, Mar. 2006.

3GPP2 C.S0024-A, 3rd Generation Partnership Project 2 '3GPP2', "cdma2000 High Rate Packet Data Air Interface Specification," Version 2.0, 1,223 pages, Jul. 2005.

B. Aboba, et al., "Extensible Authentication Protocol (EAP)," Network Working Group, RFC 3748, http://www.ietf.org/rfc/rfc3748.txt, 59 pages, Jun. 2004.

B. Aboba, D. Simon, "PPP EAP TLS Authentication Protocol," Network Working Group, RFC 2716, http://www.ietf.org/rfc/rfc2716.txt, 22 pages, Oct. 1999.

W. Simpson, "PPP Challenge Handshake Authentication Protocol (CHAP)," Network Working Group, RFC 1994, http://www.ietf.org/rfc/rfc1994.txt, 12 pages, Aug. 1996.

W. Simpson, "The Point-to-Point (PPP)," Network Working Group, RFC 1661, http://www.ietf.org/rfc/rfc1661.txt, 47 pages, Jul. 1994.

P. Eronen, et al., "Diameter Extensible Authentication Protocol (EAP) Application," Network Working Group, RFC 4072, http://www.ietf.org/rfc/rfc4072.txt, 29 pages, Aug. 2005.

P. Calhoun, et al., "Diameter Base Protocol," Network Working Group, RFC 3588, http://www.ietf.org/rfc/rfc3588.txt, 129 pages, Sep. 2003.

3rd Generation Partnership Project 2 "3GPP2"; "All-IP Core Network Multimedia Domain: Service Based Bearer Control—Stage 2;www.3gpp2.org-"; Version 1.0. Draft Version 0.21.0, 49 pages, Unknown.

PCT Notification of Transmittal of the International Search Report and the Written Opinion of the International Searching Authority, or the Declaration, International Application No. PCT/US07/05847, 9 pages, Oct. 26, 2007.

PCT Notification of Transmittal of the International Search Report and the Written Opinion of the International Searching Authority, or the Declaration, International Application No. PCT/US07/05849, 9 pages, Nov. 14, 2007.

Yegani et al., "System and Method for Access Authentication in a Mobile Wireless Network," U.S. Appl. No. 11/419,382, 20 pps, 3 pps drawings, (2104), Filed May 19, 2006.

Yegani et al., "System and Method for Handover of an Access Terminal in a Communication Network," U.S. Appl. No. 11/682,735, 24 pps, 3 pps drawings (2360), Filed Mar. 6, 2007.

Yegani et al., "Enforcement of User Level Policies from Visited Networks in a Mobile IP Environment," U.S. Appl. No. 11/682,817, 22 pps, 2 pps drawings (2359), Filed Mar. 6, 2007.

Yegani et al, Authentication of Access Terminals in a Cellular Communication Network,: U.S. Appl. No. 11/682,857, 28 pps, 5 pps drawings (2358), Filed Mar. 6, 2007.

Andreasen et al., "System and Method of Consolidating Accounting Data for a Communication Session," U.S. Appl. No. 11/714,974, 40 pps, 3 pps drawings (2404), Filed Mar. 6, 2007.

Panda et al., "System and Method for Capturing Accounting Data for a Communication Session," U.S. Appl. No. 11/715,018 (2402), Filed Mar. 6, 2007.

Rosenberg et al., "System and Method for Determining a Network for Processing Applications for a Communication Session," U.S. Appl. No. 11/715,019, 40 pps, 3 pps drawings (2406), Filed Mar. 6, 2007.

Rosenberg et al., "Determining a Policy Output for a Communication Session," U.S. Appl. No. 11/715,032, 31 pps, 4 pps drawings (2368), Filed Mar. 6, 2007.

Leung et al., "Communicating Packets Using a Home Anchored Bearer Path," U.S. Appl. No. 11/715,033, 33 pps, 4 pps drawings (2407), Filed Mar. 6, 2007.

Andreasen et al., "Posture-Based Network Authentication," U.S. Appl. No. 11/715,040, 23 pages, 2 pps drawings (2398), Filed Mar. 6, 2007.

Iyer et al., "Access Terminal for Communicating Packets Using a Home Anchored Bearer Path," U.S. Appl. No. 11/715,041, 33 pps, 4 pps drawings (2300), Filed Mar. 6, 2007.

Rosenberg et al., "System and Method for Exchanging Policy Information in a Roaming Communications Environment," U.S. Appl. No. 11/715,056, 42 pps, 3 pps drawings (2416), Filed Mar. 6, 2007.

Rosenberg et al., "Establishing Facets of a Policy for a Communication Session," U.S. Appl. No. 11/715,065, 32 pps, 4 pps drawings (2409), Filed Mar. 6, 2007.

Rosenberg et al., "Performing Deep Packet Inspection for a Communication Session," U.S. Appl. No. 11/715,073, 31 pps, 4 pps drawings (2400), Filed Mar. 6, 2007.

Rosenberg et al., "Assigning a Serving—CSCF During Access Authentication," U.S. Appl. No. 11/715,074, 22 pps, 2 pps drawings, (2410), Filed Mar. 6, 2007.

Rosenberg et al., "System and Method for Providing Emergency Services in a Visited Communications Environment," U.S. Appl. No. 11/715,111, 39 pps, 2 pps drawings (2418), Filed Mar. 6, 2007.

Andreasen et al., "System and Method for Generating a Unified Accounting Record for a Communication Session," U.S. Appl. No. 11/715,210, 46 pps, 3 pps drawings (2399), Filed Mar. 6, 2007.

Andreasen et al., "Network-triggered quality of service (QoS) Reservation," U.S. Appl. No. 11/715,250, 21 pps, 2 pps drawings (2405), Filed Mar. 6, 2007.

Andreasen et al.,; "Policy-Based Control of Content Intercept", U.S. Appl. No. 11/715,251, 23 pps, 2 pps drawings (2401).

Rosenberg et al., "System and Method for Network Charging Using Policy Peering," U.S. Appl. No. 11/715,256, 43 pps, 3 pps drawings (2415), Filed Mar. 6, 2007.

PCT Notification of Transmittal of the International Search Report and the Written Opinion of the International Searching Authority, or the Declaration, mailed Feb. 28, 2008, in re PCT/US07/05848 filed Mar. 6, 2007 (10 pages).

State Intellectual Property Office of the People's Republic of China, The First Office Action, Filing No. 200780008321.4, transmitted to Baker Botts L.L.P. Oct. 28, 2009, 8 pages.

PCT Notification of Transmittal of the International Search Report and the Written Opinion of the International Searching Authority, or the Declaration with attached PCT International Search Report and Written Opinion of the International Searching Authority in International Application No. PCT/US2006/046800, dated Nov. 10, 2008, 10 pages.

Online Inc., "Apogee Releases Content Usage-Based Billing Product Annotated Title—Software allows content usage-based billing," EContent, vol. 24, No. 5, NDN 173-0356-6509-7, 1 pg., Jul. 2001.

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg., Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs., Jan. 1998.

Business Wire, "Apogee Networks Introduces Industry's First Content Usage-Based Billing Solution for Web Hosters," NDN 219-0281-6988-1, 2 pgs., May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs., Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs., Oct. 10, 2000.

Business Wire, "Apogee Networks Unveils NetCountant Wireless Billing At Supercomm; Company Demonstrates Industry First Wireless Content Usage Based Billing Solution," NDN 218-0324-8075-6, 2 pgs., Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs., Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs., Dec. 6, 2000.

Business Wire, "Apogee Networks Joins Content Alliance; Billing Expert to Join Industry Group Aimed At Advancing Content Networking," NDN 218-0181-2716-7, 3 pgs., Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs., Jun. 19, 2000.

Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).

PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages, Oct. 25, 2007.

* cited by examiner

APPLICATION-AWARE POLICY ENFORCEMENT

RELATED APPLICATION

This application claims the benefit, under 35 U.S.C. §119 (e), of Provisional Patent Application No. 60/780,176, filed Mar. 6, 2006 which is incorporated herein by reference.

TECHNICAL FIELD

The present disclosure relates generally to communication systems.

BACKGROUND

Various standards for mobile wireless communications (such as, for example, Third Generation Partnership Project (3GPP) standards and Third Generation Partnership Project 2 (3GPP2) standards) define a basic form of application-aware policy management. While certain known techniques may be used to make application-aware policy decisions, such techniques are basic and inefficient in certain situations.

DESCRIPTION OF EXAMPLE EMBODIMENTS

Overview

In one embodiment, a method includes receiving a first message from a first manager. The first message includes a first element of a request for policy authorization. The request for policy authorization attempts to obtain authorization to use particular network resources for a particular application context. The method includes, in response to the first message, establishing a policy rendezvous state at a policy manager for a policy decision on the request for policy authorization. The method includes receiving a second message from a second manager subsequent to the first message. The second message includes a second element of the request for policy authorization, and the second element completes the request for policy authorization. The method includes, in response to the second message, making the policy decision based on the first and second elements of the request for policy authorization. The method includes, if the policy decision grants the request for policy authorization, generating a complete policy facet and communicating the complete policy facet to the first manager or the second manager to authorize the use of the particular resources for the particular application context.

Description

Figure 1:
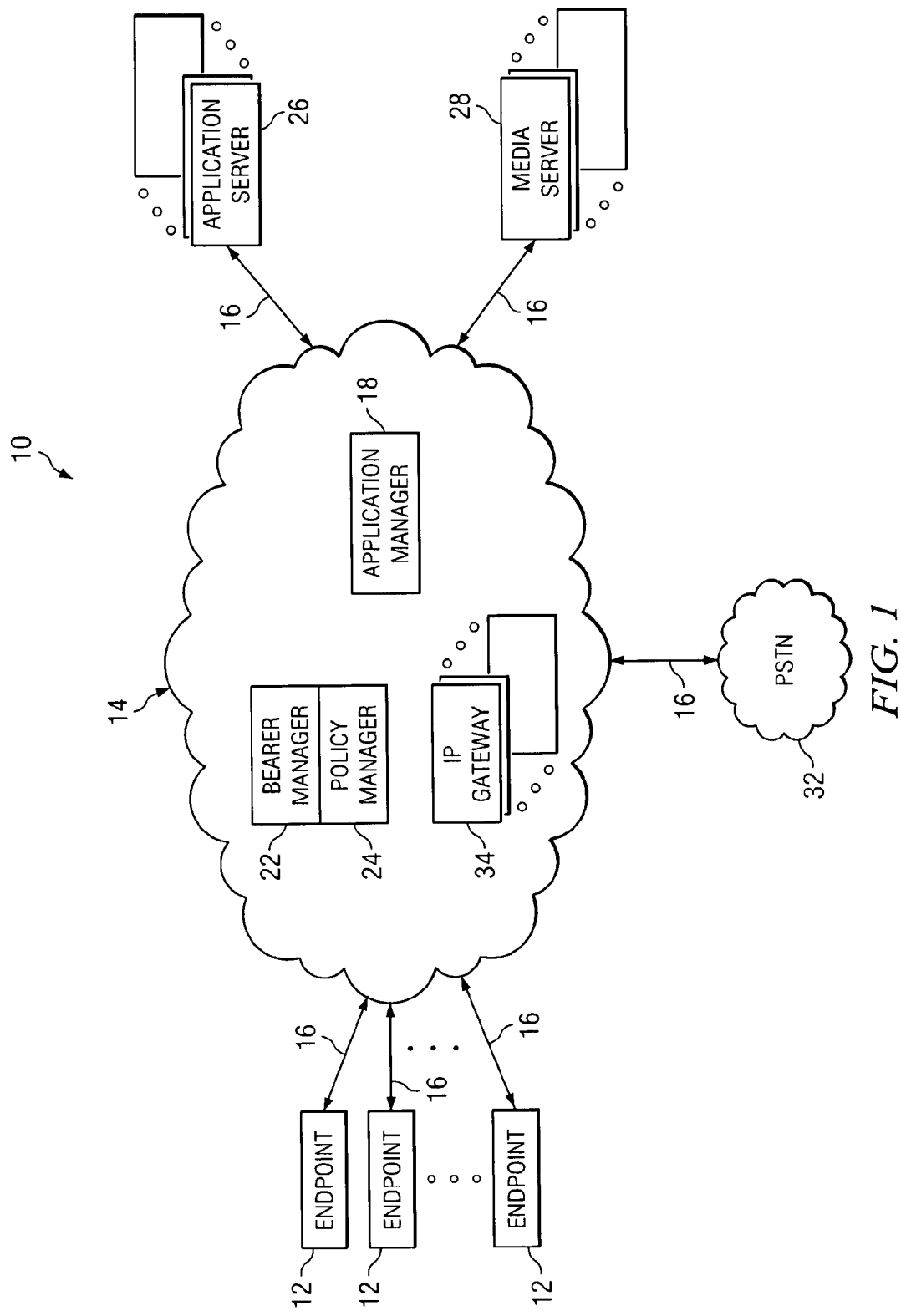
FIG. 1 illustrates an example system for application-aware policy enforcement.

FIG. 1 illustrates an example system 10 for application-aware policy enforcement. System 10 includes one or more endpoints 12 coupled to a network 14. One or more application servers 26, one or more media servers 28, and the Public Switched Telephone Network (PSTN) 32 are also coupled to network 14. Endpoints 12 communicate with each other and with application servers 26, media servers 28, and PSTN 32 via network 14. In particular embodiments, network 14 includes a local area network (LAN), a wireless LAN (WLAN), a wide area network (WAN), a metropolitan area network (MAN), a portion of the Internet, or another network 14 or a combination of two or more such networks 14. The present disclosure contemplates any suitable network 14 or combination of networks 14. As an example and not by way of limitation, one or more portions of network 14 may provide a Code Division Multiple Access (CDMA) Evolution Data Optimized (EVDO)-based wireless network infrastructure. One or more portions of network 14 may have a Multimedia Domain Plus (MMD+) or similar system architecture.

One or more links 16 couple an endpoint 12 to network 14. Similarly, one or more links 16 couple one or more application servers 26 to network 14, one or more links 16 couple one or more media servers 28 to network 14, and one or more links 16 couple PSTN 32 to network 14. In particular embodiments, one or more links 16 each include one or more wireline, wireless, or optical links 16. In particular embodiments, one or more links 16 each include a LAN, a WLAN, a WAN, a MAN, a radio access network (RAN), a portion of the Internet, or another link 16 or a combination of two or more such links 16. As an example and not by way of limitation, a link 16 between one or more endpoints 12 (such as, for example, EVDO Rev A-based ATs) and network 14 may include a RAN that has a particular coverage area and provides Layer 2 mobile access, quality of service (QoS), mobility, and handoff services in its particular coverage area. The RAN may include one or more radio resource managers (RRMs) and one or more base transceiver stations (BTSs). The present disclosure contemplates any suitable links 16. In particular embodiments, one or more endpoints 12 share with each other one or more portions of one or more links 16 to network 14. Similarly, in particular embodiments, one or more application servers 26, media servers 28, or both share with each other one or more portions of one or more links 16 to network 14. In particular embodiments, one or more first links 16 may differ from one or more second links 16. As an example and not by way of limitation, a first link 16 including a RAN may couple one or more endpoints 12 (such as, for example, EVDO Rev A-based ATs) to network 14 and a second link including a PSTN gateway may couple PSTN 32 to network 14. The PSTN gateway may reside wholly or partially in network 14. In particular embodiments, one or more links 16 may each include one or more components that reside in network 14. A link 16 need not necessarily terminate outside network 14. The present disclosure contemplates any suitable arrangements of any suitable links 16 coupling endpoints 12, application servers 26, media servers 28, and PSTN 32 to network 14.

In particular embodiments, an application server 26 provides one or more applications to one or more endpoints 12. As an example and not by way of limitation, an application may include one or more Session Initiation Protocol (SIP)-based communication applications, such as, for example, Internet Protocol (IP) telephony. As another example, an application may include one or more non SIP-based applications, such as, for example, video streaming, gaming, or collaboration. An endpoint 12 may invoke a SIP-based communication application at application server 26 through an application manager 18 in network 14. Application manager 18 may be a hardware, software, or embedded logic component or a combination of two or more such components facilitating integration of the application domain of network 14 into a policy framework and a security infrastructure of network 14, as described below. An endpoint 12 may invoke a non SIP-based application at application server 26 directly, but policy manager 24 may manage access to the network resources, as described below. Policy manager 24 may also coordinate network resources supporting delivery of the non SIP-based application. In particular embodiments, one or more first application servers 26 provide SIP-based communication applications and one or more second application servers 26 provide non SIP-based communication applications. In particular embodiments, application servers 26 providing SIP-based communication applications reside in network 14 on top of application manager 18. In particular embodiments, an application server 26 is either stand-alone or user-specific. As an example and not by way of limitation, a stand-alone application server 26 may provide general application services, which users at endpoints 12 may invoke explicitly by reference to the name of their associated services, for example, via a specific SIP uniform resource identifier (URI), a telephone number, or a dial string. Provision of the general application services need not involve originating or terminating call/request treatment. A user-specific application server 26 may provide application services that involve originating or terminating call/request treatment. An application server 26 may also be present inside bearer manager 22, IP gateway 34, or any other network element in network 14. Application server 26 may for example be an application proxy for an application detected by use of deep packet inspection or packet flow optimization. An application server for SKYPE may for example be provided this way. In particular embodiments, invocation of such applications enable provision of QoS for those applications. The present disclosure contemplates any suitable application servers 26 providing any suitable applications to endpoints 12, whether directly or indirectly.

In particular embodiments, media servers 28 provide one or more media processing functions to one or more application servers 26. As an example and not by way of limitation, media processing functions may include interactive voice response (IVR), mixing functions, transcoding, announcement functions, messaging functions, and other functions supporting bearer-related services. Media processing functions may service enablers, e.g., coarse-grained application components that tend to lack utility by themselves, but are useful to other applications. In particular embodiments, one or more media servers 28 are integrated into one or more application servers 26. In particular embodiments, one or more media servers 28 are stand-alone resources relative to one or more SIP application servers 26 subject to control by typical SIP procedures, such as the use of INVITE messages.

In particular embodiments, an endpoint 12 enables a user at endpoint 12 to communicate with one or more users at one or more other endpoints 12, communicate with one or more users at one or more telephones or other devices across PSTN 32, or both. As an example and not by way of limitation, an endpoint 12 may be an EVDO Rev A-based AT. An endpoint 12 may be a mobile IP telephone. An endpoint 12 may be a dual-mode telephone including both EVDO Rev A or other cellular functionality and mobile IP functionality. An endpoint 12 may be a personal digital assistant (PDA) including EVDO Rev A or other cellular functionality, mobile IP functionality, or both. An endpoint 12 may be a network-enabled media player including EVDO Rev A or other cellular functionality, mobile IP functionality, or both. Herein, reference to media encompasses audio, video, other media, or a combination of two or more such media. An endpoint 12 may be a network-enabled still or video camera. An endpoint 12 may be a notebook computer system, which may run a telephony application such as, for example, SKYPE. An endpoint 12 may include one or more unattended or automated systems (such as for example, video cameras, video monitors, or gateways or other intermediate components) or other devices capable of communicating to or from network 14. Herein, reference to an endpoint 12 encompasses one or more access terminals (ATs), and vice versa, where appropriate. The present disclosure encompasses any suitable endpoints 12.

Network 14 includes an application manager 18, a bearer manager 22, a policy manager 24, one or more IP gateways 34, and services data manager (SDM). As described above, in particular embodiments, network 14 also includes a PSTN gateway facilitating communication between network 14 and PSTN 32. In particular embodiments, components of network 14 are distributed across multiple cities or geographical regions. In particular embodiments, components of network 14 use IP, SIP, or both (possibly in addition to one or more other protocols, such as Real-Time Streaming Protocol (RTSP)) to communicate with each other. In particular embodiments, components of network 14 use IP, SIP, or both to communicate with endpoints 12, application servers 26, and media servers 28. Herein, reference to IP encompasses any suitable version of IP, such as IPv4, Mobile IPv6, or a combination of the two, where appropriate. In particular embodiments, network 14 is a packet-switched network and components of network 14 communicate packets to and from each other. As an example and not by way of limitation, a packet communicated from one or more first components of network 14 to one or more second components of network 14 may include bearer data (such as for example, audio data, video data, voice data, other data, or a combination of such bearer data), signaling data, or both. Herein, reference to a packet encompasses a cell, a frame, a datagram, or another unit of data or a combination of two or more such packets, where appropriate.

Policy manager 24 is a hardware, software, or embedded logic component or a combination of two or more such components for managing policies in network 14. Herein, where appropriate, reference to a policy encompasses a set of rules for utilizing network resources (such as, for example, QoS-related resources, access and connectivity parameters, mobility resources, accounting resources, deep packet inspection resources, or transcoding or other bearer-specific resources) to support applications that run on network 14. In particular embodiments, a rule specifies an action to occur if one or more conditions are satisfied. As an example and not by way of limitation, a request from an endpoint 12 to an IP gateway 34 asking IP gateway 34 for access to network 14 may invoke one or more policy processes or policy authorization. IP gateway 34 may in turn ask policy manager 24 whether to allocate network resources at IP gateway 34 for endpoint 12. The question posed by IP gateway 34 to policy manager 24 may take the general form, "User X has asked perform action Y using implementation Z. What network resources should I allocate to user X?" In response to the question from IP gateway 34, policy manager 24 may make one or more policy decisions concerning how IP gateway 34 should allocate network resources at IP gateway 34 for endpoint 12 and then initiate implementation of the one or more policy decisions.

In particular embodiments, policy manager 24 is responsible for all policy decisions in network 14. In particular embodiments, policy manager 24 makes a policy decision based on one or more inputs. As an example and not by way of limitation, one or more inputs to a policy decision may be description of one or more requested network resources. A requested network resource may be a QoS, which may specify a minimum amount of bandwidth for an application. A requested network resource may be a geographical specification for one or more components of system 10 for allocation to an endpoint 12, which may enhance the mobility of endpoint 12. One or more inputs to a policy decision may be an application context. An application context may describe an application framework for the utilization of network resources. The application context may include the name or another identification of each of one or more applications being invoked. The application context may also include details about the application invocation that enables the policy manager to make a more informed application-aware policy decision. The application context may include not only the name of the application, but also application context information for each of the network resources being requested. For example, the application context may inform the policy manager that network resources are being requested for an "audio" media stream using the "PCMU" audio codec and a "video" media stream using the "H.263" video codec in "CIF" format. Provided with such information, policy manager 24 may make policy decisions that take this context information into consideration. For example, policy manager 24 may inform application manager 18 that the request is allowed to proceed for the "audio" part using "PCMU," whereas the request for "video" is only allowed to proceed with "H.263" in the "QCIF" format. The resulting network resources granted by policy manager 24 are thus dependent on this context information. In particular embodiments, when a bearer manager 22 or other component of system 10 requests one or more network resources, policy manager 24 makes one or more policy decisions on the request based on a combination of a description of the requested network resources and an application context of the request, as described below. In particular embodiments, the output of the process of making the policy decisions is one or more policy facets.

In particular embodiments, policy manager 24 generates and communicates policy facets to implement policy decisions. A policy facet is a set of rules describing one or more policy decisions for installation and execution at one or more components of system 10. As an example, policy manager 24 may use a network facet generated by bearer manager 22 and an application facet generated by application manager 18 to generate a policy facet describing one or more policy decisions made by policy manager 24. The network facet may describe one or more network resources being requested, and the application facet may describe an application context for utilization of the network resources being requested. Policy manager 24 may combine the network facet and the application facet to generate a policy facet including a set of rules describing one or more policy decisions made by policy manager 24 concerning the requested network resources.

Policy manager 24 may generate complete policy facets or partial policy facets for later completion. As an example and not by way of limitation, a policy manager 24 may receive an application facet (describing a particular application context) from application manager 18 and combine it with a network facet (identifying particular network resources to be reserved) from bearer manager 22 to generate a complete policy facet having a full set of policy rules controlling utilization of the identified network resources by particular components of system 10 for the application identified by the application facet. Policy manager 24 may receive the application facet and the network facet asynchronously with respect to each other, as described below. After receiving a policy facet, a network element may act according to the policy decision underlying the policy facet. As an example an not by way of limitation, a policy facet may include instructions to provide QoS to an endpoint 12 and policy manager 24 may install the policy facet at a component of system 10 responsible for ensuring QoS to endpoint 12.

In particular embodiments, a policy model of network 14 includes an input/output process executed by policy manager 24: the input being the various policy contexts received in a policy authorization request and the output being various policy facets and application behavior modifiers (ABMs). The policy facets are various policy enforcement parameters related to, for example, access, mobility, QoS, charging, deep packet inspection, and security that are sent toward bearer manager 22. ABMs are various application behavior rules that are sent toward application manager 18. For a policy decision, policy manager 24 may need context information from both bearer manager 22 and application manager 18 and policy manager 24 may receive the context information asynchronously. Particular embodiments use a policy rendezvous point or state that defines behavior when policy manager 24 receives part of a request for network resources from application manager 18 before the remainder of the request from bearer manager 22, or vice versa.

In particular embodiments, the instructions in a policy facet correspond to a policy decision concerning the utilization of network resources by one or more endpoints 12 for one or more applications running on network 14. In particular embodiments, a policy facet includes instructions on restricting network access to endpoint 12, instructions on granting a QoS to endpoint 12, other instructions, or a combination of two or more such instructions. As an example and not by way of limitation, instructions on granting a QoS to endpoint 12 may include instructions on reserving bandwidth (which may specifying an amount of bandwidth for a set of packets); instructions on generating one or more packet markers (which may set a differential service code point for a set of packets); instructions on generating one or more traffic shapers or policers (which may specify packets to drop, mark, or shape); instructions on generating one or more authorization envelopes (which specify a maximum bandwidth allocatable to an endpoint 12); other instructions; or a combination of two or more such instructions. Such instructions may be QoS facets.

As an example and not by way of limitation, a network facet (which policy manager 24 may use to generate a policy facet) may describe QoS for an endpoint 12 or an application. A network facet may also describe mobility, access, deep packet inspection (DPI), transcoding, or other functionality for implementation of a policy decision. A network facet may identify network resources for reservation to provide underlying functionality described by the network facet, such as, for example, the provision of QoS to an endpoint 12. Policy manager 24 may communicate policy facets to components of system 10 synchronously or asynchronously. In particular embodiments, a policy decision depends on a network facet (which policy manager 24 may use to generate a policy facet), an application context (which may describe an application being invoked and one or more characteristics of the application), and possibly a question regarding whether the application should terminate or proceed according to a set of tokens representing actions that the application may take. As an example and not by way of limitation, a video streaming application may have a token called "pic-size" defining the size of the streamed image. Accordingly the token may present possible resolution values of "CIF", "QCIF" or "SQCIF." Common Intermediate Format (CIF) may standardize horizontal and vertical resolution of pixels and may provide a 352×288 resolution. QCIF may provide a 176×144 resolution. SQCIF may provide a 128×96 resolution. Upon receiving an application facet including the "pic-size" token, policy manager 24 may make a decision, based on network congestion, to allow the video streaming application to utilize only the lowest resolution format, e.g., SQCIF. In particular embodiments, policy manager 24 may do this by generating a policy facet instructing a video-streaming application server 26 that the "pic-size" variable should have the value "SQCIF". In particular embodiments, SIP and non SIP applications may be tied to a policy decision. In the case of SIP-based applications, tokens may be communicated to application manager 18, allowing policy decisions to impact the invocation, feature interaction, and termination of applications. In the case of non SIP applications, an application developer may provide a set of controls for the non SIP application to export. The controls may represent different functions that the non SIP application may support based on input from network 14.

In particular embodiments, a policy document defines the policy process for network 14. The policy document may be a script expressed in a high-level scripting language that allows for constraint-based expressions. The constraint-based expressions may describe conditions that, if true, result in the creation of a policy facet or set of policy facets. As an example and not by way of limitation, the actions described by a policy facet may be expressed through a set of generic set-variable instructions. In particular embodiments, this allows for a policy document to control the behavior of an application and the network resources it may use without requiring an upgrade to policy manager 24 or other components of network 14 as new applications are added.

Generally, a policy facet may be installed through a push mode or a pull mode. In push mode, policy manager 24 may make an arbitrary policy decision and generate a policy facet corresponding to the policy decision and actively push the policy facet to a particular element in the network 14, using a policy install message. The particular element receiving the facet may make a localized decision about whether the installation of the facet may succeed and then rejects or accepts the facet. In the pull model, a particular element receives a request for some action to be taken. In turn, the particular element asks policy manager 24 (using an Authorize Request) what to do. In many cases, this request from the particular element will contain information that is nearly identical to the facet that policy manager 24 will return to the particular element. The request to policy manager 24 may describe the set of conditions for which a desired action is to occur. As an example, a QoS request from a cell phone may have the form, "For this stream of packets, I want a certain amount of bandwidth." This request is actually asking for a specific action to be taken (providing bandwidth) under a specific condition (packets to match a flowspec). Consequently, policy manager 24 may make a decision, and, depending on the question, provide a facet granting, denying, or modifying the requested resources.

Policy manager 24 may, at times, respond immediately to a resource request from a particular network element with a completed policy facet. However, in other cases policy manager 24 cannot respond immediately, because policy manager 24 is waiting for additional information from one or more additional network elements. For example, policy manager 24 often requires information from both application manager 18 and bearer manager 22 in order to make a fully qualified policy decision and generate a complete policy facet. Frequently, this information may arrive at policy manager 24 asynchronously causing a delay in the policy decision-making process. For example, when a particular element of network 14 (e.g., bearer manager 22) makes a pull request for network resources in the form of a network facet, the approval of the network facet may depend on correlating the network facet with an application context. The application context, may provide policy manager 24 with the application framework in which the resources identified by the network facet will be utilized. As an example and not by way of limitation, the application context may be transmitted to policy manager 24 as part of an application facet from the application manager 18. Thus, in particular embodiments policy manager 24 must receive both a network facet from bearer manager 22 and a corresponding application facet from application manager 18 to make its application-aware policy decision and generate a completed policy facet.

Information from different network elements may arrive at policy manager 24 asynchronously. Policy manager 24 may be capable of initiating a rendezvous state during which policy manager 24 will await the arrival of the information that it needs from the different network elements. As an example and not by way of limitation, policy manager 24 may receive a network facet from bearer manager 22 identifying particular network resources that bearer manager 22 would like to reserve. Upon receiving this network facet, policy manager 24 may initiate a policy rendezvous state during which to await the arrival of a corresponding application context. The application context may be sent to policy manager 24 from application manager 18 in the form of an application facet. When the application facet from application manager 18 arrives, policy manager 24 may then correlate the facets together, make a policy decision, and push the completed policy facet to the proper network elements (e.g., bearer manager 22 and application manager 18).

Correlation of multiple facets in the case of a policy rendezvous may be accomplished using different pieces of information. The first piece of information may be a subscriber ID, which may be identical for related facets. The second piece of information may include IP packet classifiers (system 10 may include both network classifiers and application classifiers) which define the set of packets to which a facet applies. In particular embodiments, a classifier is a condition that detects whether two IP datagrams or packets match. Classifiers may be based on 5-tuple matches (including wildcards) and may also be based on deeper inspection, including values of headers at higher layers, such as HTTP URLs. A network facet may correlate to an application facet when a packet matching the network classifier matches the application classifier. A packet not matching the network classifier would not match the application classifier. In case of multiple matches, the most specific match may be used.

In the case of a SIP call setup, a QoS network facet (representing a request for various network resources) and a SIP application facet (representing the voice call application context) may need to rendezvous. To correlate these two facets, policy manager 24 may require the classifiers associated with the facets. Since the QoS facet may be pulled from an IP gateway 34, the QoS facet may contain a classifier based on the QoS request made to the corresponding access network, such as a corresponding RAN. As for the SIP application facet, it may contain Session Description Protocol (SDP) identifying the media flows, and application manager 18 may turn these SDPs into classifiers that it passes to policy manager 24 as part of the application facet.

In certain embodiments, policy manager 24 may provide the source of a first facet with a "pending response" notifying the source that policy manager 24 is awaiting information from a second source before making a policy decision. As an example and not by way of limitation, if policy manager 24 receives a network facet from bearer manager 22 identifying a particular amount of bandwidth that bearer manager 22 would like to reserve, policy manager 24 may initiate a policy rendezvous state and send bearer manager 22 a pending response notifying bearer manager 22 that policy manager 24 will make a policy decision once it is informed about the application in which the requested bandwidth will be utilized (e.g., once it receives the application context). Upon receiving a pending response from policy manager 24, bearer manager 22 may make various preparations in anticipation of receiving and installing the completed policy facet from policy manager 24. In the case of a request for bandwidth allocation, bearer manager 22 may reserve a certain amount of bandwidth in anticipation of receiving the policy manager's decision. Once policy manager 24 has made its policy decision and transmitted a complete policy facet to bearer manager 22, bearer manager 22 may commit the reserved network resources (e.g., the reserved bandwidth) in accordance with the policy provided. One particular embodiment of the present invention could be implemented as part of a SIP call setup wherein particular QoS resources could be reserved in anticipation of sending a SIP INVITE. Such functionality would thus avoid the use of preconditions.

In particular embodiments, a timeout may be associated with the rendezvous state in policy manager 24, bearer manager 22, and/or other network components. The timeout could be variable or fixed according to predetermined criteria. As an example and not by way of limitation, if after initiating the rendezvous state in response to receiving a first facet (e.g. a network facet identifying particular network resources to be reserved), policy manager 24 does not receive a second facet from the element responsible for providing second facet during the rendezvous state (e.g., an application facet from application manager 18), policy manager 24 may push a reject decision towards the network element that sent the first facet (e.g., bearer manager 22). Bearer manager 22 may then cancel any resources that it may have reserved in anticipation of receiving a completed policy facet from policy manager 24. As an example and not by way of limitation, bearer manager 22, or another network element, may initiate a timeout of its own and thereby act on its own initiative.

Policy manager 24 may be capable of yielding similar functionality to all elements of system 10. As an example and not by way of limitation, it is within the scope of the present invention to include situations where an application facet from application manager 18 is received before the corresponding network facet is received from bearer manager 22. Accordingly, policy manager 24 may provide application manager 18, or any other component requesting a policy decision, with functionality similar to that described above. One of skill in the art will assuredly recognize that these features could be implemented at any number of points using any number of different elements throughout system 10 and that the present embodiments have only been limited in their respective compositions and configurations for the sake of explanatory simplicity.

In particular embodiments, policy manager 24 needs context information from both application manager 18 and bearer manager 22 for a fully-qualified policy decision. However, request from application manager 18 and bearer manager 22 may be received asynchronously. Particular embodiments employ a policy rendezvous state and the concept of a "pending policy decision" for handling such cases. This scheme may utilize a combination of both PULL and PUSH-based policy models. When policy manager 24 receives a request from bearer manager 22 for policy authorization first, policy manager 24 does not have any knowledge on the applications being invoked by the subscriber. So policy manager 24 goes to a "policy rendezvous" state at this point and provides a pending response to bearer manager 22. Bearer manager 22 notes such a pending state and may make preparations for various policy facet installation. For example, for bandwidth call admission control, bearer manager 22 may reserve a certain amount of bandwidth for the subscriber. When policy manager 24 receives the request from application manager 18, policy manager 24 comes to know about the application context, makes an application-aware policy decision, and pushes the complete policy facet to bearer manager 22. Bearer manager 22, upon receiving the complete facet, may commit the network resources needed for the subscriber. There may be a timeout associated with the rendezvous state in both policy manager 24 and bearer manager 22. If policy manager 24 does not receive a request from application manager 18 during the time period of the timeout, policy manager 24 may push a reject decision toward bearer manager 22. Similarly, this mechanism may also be used when policy manager 24 receives the policy authorization request from application manager 18 first and policy manager 24 needs to wait for the request from bearer manager 22 for providing the complete policy decision for the ABMs to application manager 18. An operator may deploy one or both of the above models for policy management.

In particular embodiments, bearer manager 22 is responsible for enforcing policy facets and controlling network resources. Bearer manager 22 may include a hardware, software, or embedded logic component or a combination of two or more such components for managing bearer paths in network 14. Generally speaking, managing bearer traffic in network 14 may, as an example and not by way of limitation, include establishing, monitoring, and taking down bearer paths between or among components of system 10. In particular embodiments, bearer manager 22 also facilitates operations such as signal processing, allocating network resources, and managing gateways (such as, for example, IP gateways 34) for endpoints 12. In particular embodiments, bearer manager 22 resides at one or more servers in network 14. In particular embodiments, bearer manager 22 and policy manager 24 coreside with each other at one or more servers in network 14. In particular embodiments, bearer manager 22 includes a Serving General Packet Radio Services (GPRS) Support Node (SGSN), a Gateway GPRS Support Node (GGSN), a home/foreign agent, a mobile gateway, a Mobile IPv6 node, a Packet Data Serving Node (PDSN), or a combination of two or more such components. Bearer manager 22 uses any suitable protocol (such as, for example, an IP multimedia subsystem (IMS) protocol) to communicate with one or more other components of system 10.

In particular embodiments, since bearer manager 22 manages bearer paths in network 14, bearer manager 22 is charged with reserving particular network resources to perform its duties. When faced with a decision as to whether bearer manager 22 should reserve particular network resources, bearer manager 22 may generate a network facet asking policy manager 24 to make a policy decision on behalf of bearer manager 22. As an example and not by way of limitation, when an endpoint 12 attempts to obtain resources from to network 14 through a RAN in order to place a SIP call, endpoint 12 may be granted a particular QoS from the RAN. Bearer manager 22 may be contacted regarding the RAN-granted QoS and asked to reserve particular network resources to maintain the RAN-granted QoS on network 14. Bearer manager 22 may contact policy manager 24 and ask policy manager 24 to make a policy decision as to whether bearer manager 22 should reserve the requested resources. Bearer manager 22 may then await a policy decision from policy manager 24. As an example and not by way of limitation, the policy decision may (1) inform bearer manager 22 that the particular resources should be committed to use in the application, (2) inform bearer manager 22 that the particular resources should not be committed to use in the application, (3) inform bearer manager 22 that more resources than were initially requested should be committed to use on behalf of the application, or (4) inform bearer manager 22 that less resources that were initially requested should be committed to use on behalf of the application.

In particular embodiments, application manager 18 is responsible for maintaining application states. Application manager 18 may include a hardware, software, or embedded logic component or a combination of two or more such components facilitating integration of the application domain of network 14 into a policy framework and a security infrastructure of network 14. Application manager 18 may be responsible for basic SIP functions, such as SIP registration and SIP call routing. Application manager 18 may further provide a basic set of voice features such as, call forwarding and call screening. Application manager 18 may further be responsible for authorizing SIP calls to and from endpoints 12, and routing those calls to the right terminating component, whether it be another application manager, a gateway to the PSTN 32, or a peer operator. When faced with a decision as to whether a particular application should be invoked, application manager 18 may generate an application facet asking policy manager 24 to make a policy decision regarding, among other things, whether to invoke the application. As an example and not by way of limitation, application manager 18 may wish to forward a SIP INVITE on behalf of a user attempting to make a call. Upon receiving a request to forward the SIP INVITE, application manager 18 may communicate the application context to policy manager 24 in the form of an application facet that may include tokens classifying the request (e.g., the application type, the media type, etc.), QoS parameters for the request, classifier information, and a subscriber identity associated with the request and then await a policy decision from policy manager 24 as to how to proceed. Policy manager 24 may send application manager 18 a pending response if policy manager 24 is still awaiting information from other network sources (such as for example, bearer manager 22). In response to receiving the pending response, application manager 18 may make various preparations in anticipation of receiving a completed policy facet from policy manager 24. Policy manager 24 may compare the application context with a request for network resources from bearer manager 22 and then, based on its comparison generate a complete policy facet informing application manager 18 how to proceed.

Application Manager 18, or a non SIP application server 26, may also ask for a policy decision to be made by policy manager 24 when classifier information is not yet available. Such abilities may provide important efficiencies that enable system 10 to support example SIP calls to a terminating endpoint 12 without requiring the use of preconditions, while still allowing application-aware policy decisions related to network resources to be made.

In particular embodiments, application manager 18 may use Telephone Number Mapping (ENUM) to facilitate the routing of calls between components of system 10, and may leverage configured routing tables to route calls to the PSTN 32. Application manager 18 may also be responsible for invocation of SIP-based application servers 26, which may provide services like IP centrex and Push-To-Talk. One or more application servers 26 may reside on top of application manager 18 and may be accessed using an IP multimedia subsystem (IMS) service control (ISC) interface. In particular embodiments, application manager 18 may provide service capabilities interaction management (SCIM) functions, which perform feature interaction management amongst the application manager's internal features. Application manager 18 may interact with policy manager 24 over a DIAMETER interface, informing policy manager 24 of SIP session requests so that network 14 may be properly configured to support those sessions.

In particular embodiments, application manager 18 may serve a set of SIP users and enable originating and terminating services to be provided for those users. Application manager 18 may do so by providing a generic and flexible SIP processing platform through which the implementation and deployment of new SIP services may be enabled. Application manager 18 may provide a set of common core functions that are of relevance to other SIP entities in the system, and in particular to external SIP application servers 26. In particular embodiments, new SIP services are provided through these external SIP application servers 26. In particular embodiments, application manager 18 not only provides a set of generic SIP capabilities, but also provides general integration capabilities with the overall policy framework, general security infrastructure, and common data store functions of system 10.

In particular embodiments, access to network 14 is enforced by one or more IP gateways 34. Consequently, IP gateways 34 may be at least partly responsible for authentication of endpoints 12 to network 14, which may be accomplished through an Extensible Authentication Protocol (EAP) exchange. An IP gateway 34 may communicate with a RAN in a link 16 using an A10, A11, or A12 CDMA interface, may perform handoff functions between itself and the RAN, may facilitate registration of one or more endpoints 12 to network 14, and may assign a bearer manager 22 to an endpoint 12.

Figure 2:
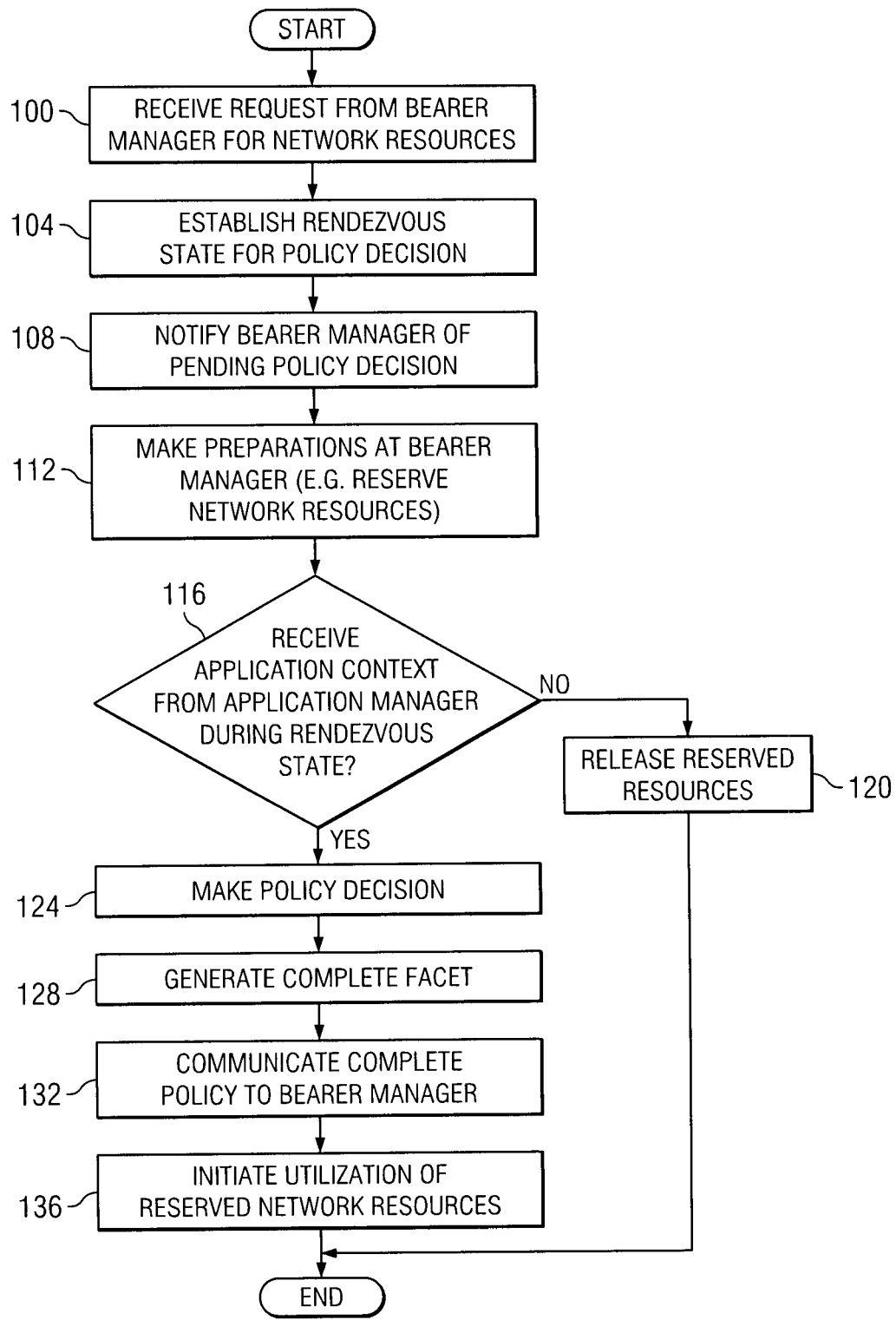
FIG. 2 illustrates an example method for application-aware policy enforcement.

FIG. 2 illustrates an example method for application-aware policy enforcement. The method begins at step 100, where bearer manager 22 contacts policy manager 24 requesting a policy decision regarding whether bearer manager 22 may reserve particular network resources to an as yet undefined use. The request from bearer manager 22 may be a policy request. At this point, policy manager 24 only has information regarding the resources to be allocated, but does not have information regarding the context in which the resources will be used. At step 104, policy manager 24 establishes a rendezvous state to await the arrival of the application context from application manager 18. A step 108, policy manager 24 sends bearer manager 22 a "pending response" after establishing the rendezvous state. This process applies equally as well to situations where policy manager 24 receives the application facet from application manager 18 first and establishes a rendezvous state to await the arrival of the network facet from bearer manager 22. In such cases, application manager 18 (instead of bearer manager 22) may receive a pending response. At step 112, bearer manager 22 (or application manager 18, depending on which manager contacts policy manager first), upon receiving the pending response, makes various preparations to receive the completed policy decision from policy manager 24. At step 116, policy manager 24 receives the corresponding application facet from application manager 18 during the rendezvous state or does not receive the corresponding application facet from application manager 18 during the rendezvous state. At step 120, if policy manager 24 does not receive an application facet from application manager 18 during the rendezvous state, then policy manager 24 sends a message to bearer manager 22 commanding bearer manager 22 to cancel any reserved network resources, at which point the method ends.

At step 124, the policy manager 24 receives the application facet during the rendezvous state and therefore makes a policy decision. At step 128, policy manager 24 generates a complete policy facet embodying its policy decision. At step 132, policy manager 24 communicates the completed policy facet to bearer manager 22 and/or any other network components that may be awaiting the policy decision such as application manager 18. At step 136, bearer manager 22 and/or any other related elements install the completed policy facet from policy manager 24 and initiate implementation of the policy decision, at which point the method ends. Although particular steps of the method illustrated in FIG. 2 are described and illustrated as occurring in a particular order, the present disclosure contemplates any suitable steps of the method illustrated in FIG. 2 occurring in any suitable order. Moreover, although particular components of FIG. 1 are described and illustrated as executing particular steps of the method illustrated in FIG. 2, the present disclosure contemplates any suitable components executing any suitable steps of the method illustrated in FIG. 2.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A method comprising:
receiving a first message from a first manager, the first message comprising a first element of a request for policy authorization, the request for policy authorization attempting to authorize use of particular network resources for a particular application context, the particular network resources comprising one or more quality-of-service (QoS) resources, access and connectivity parameters, mobility resources, accounting resources, deep-packet-inspection resources, or transcoding resources, the particular application context comprising a particular application framework;
in response to the first message, establishing a policy rendezvous state at a policy manager for a policy decision on the request for policy authorization;
during the policy rendezvous state, communicating to the first manager a second message indicating that the policy decision is pending, receipt of the second message at the first manager initiating one or more processes at the first manager in preparation for use of the particular network resources or application parameters for the particular application context;
receiving a third message from a second manager subsequent to the first message, the third message comprising a second element of the request for policy authorization, the second element completing the request for policy authorization;
in response to the third message, making the policy decision based on the first and second elements of the request for policy authorization; and
if the policy decision grants the request for policy authorization, generating a complete policy facet and communicating the complete policy facet to the first manager or the second manager to authorize use of the particular network resources or the application parameters for the particular application context.

2. The method of claim 1, wherein:
the first manager is a bearer manager;
the first element of the first message identifies the particular network resources;
the second manager is an application manager; and
the second element of the third message identifies the particular application context.

3. The method of claim 1, wherein:
the first manager is an application manager;
the first element of the first message identifies the particular application context;
the second manager is a bearer manager; and
the second element of the third message identifies the particular network resources.

4. The method of claim 1, wherein the particular application framework comprises:
a particular application; and
network resources for use by the application.

5. The method of claim 4, wherein the particular application framework further comprises one or more of:
one or more constituent components of the application;
one or more parameters describing each of the constituent components; or
one or more network resources for use by each of the constituent components.

6. The method of claim 1, wherein the rendezvous state comprises a timeout.

7. The method of claim 1, further comprising releasing one or more network resources reserved in response to the first message if the third message fails to arrive during the rendezvous state.

8. The method of claim 1, further comprising releasing one or more network resources reserved in response to the first message if the policy decision denies the request for policy authorization.

9. The method of claim 1, wherein the policy facet comprises a network facet, an application facet, or both.

10. The method of claim 1, wherein the particular application context is an Internet Protocol (IP) telephone service.

11. The method of claim 1, wherein making the policy decision comprises comparing the particular network resources in the request for policy authorization with network resources authorized for use by a particular application identified by the particular application context.

12. An apparatus comprising:
one or more processors; and
a memory coupled to the processors comprising instructions executable by the processors, the processors operable when executing the instructions to:
receive a first message from a first manager, the first message comprising a first element of a request for policy authorization, the request for policy authorization attempting to authorize use of particular network resources for a particular application context, the particular network resources comprising one or more quality-of-service (QoS) resources, access and connectivity parameters, mobility resources, accounting resources, deep-packet-inspection resources, or transcoding resources, the particular application context comprising a particular application framework;
in response to the first message, establish a policy rendezvous state at a policy manager for a policy decision on the request for policy authorization;
during the policy rendezvous state, communicate to the first manager a second message indicating that the policy decision is pending, receipt of the second message at the first manager initiating one or more processes at the first manager in preparation for use of the particular network resources or application parameters for the particular application context;
receive a third message from a second manager subsequent to the first message, the third message comprising a second element of the request for policy authorization, the second element completing the request for policy authorization;

in response to the third message, make the policy decision based on the first and second elements of the request for policy authorization; and if the policy decision grants the request for policy authorization, generate a complete policy facet and communicating the complete policy facet to the first manager or the second manager to authorize use of the particular network resources or the application parameters for the particular application context.

13. The apparatus of claim 12, wherein:
the first manager is a bearer manager;
the first element of the first message identifies the particular network resources;
the second manager is an application manager; and
the second element of the third message identifies the particular application context.

14. The apparatus of claim 12, wherein:
the first manager is an application manager;
the first element of the first message identifies the particular application context;
the second manager is a bearer manager; and
the second element of the third message identifies the particular network resources.

15. The apparatus of claim 12, wherein the particular application framework comprises:
a particular application; and
network resources for use by the application.

16. The apparatus of claim 15, wherein the particular application framework further comprises one or more of:
one or more constituent components of the application;
one or more parameters describing each of the constituent components; or
one or more network resources for use by each of the constituent components.

17. The apparatus of claim 12, wherein the rendezvous state comprises a timeout.

18. The apparatus of claim 12, wherein the processors are further operable when executing the instructions to release one or more network resources reserved in response to the first message if the third message fails to arrive during the rendezvous state.

19. The apparatus of claim 12, wherein the processors are further operable when executing the instructions to release one or more network resources reserved in response to the first message if the policy decision denies the request for policy authorization.

20. The apparatus of claim 12, wherein the policy facet comprises a network facet, an application facet, or both.

21. The apparatus of claim 12, wherein the particular application context is an Internet Protocol (IP) telephone service.

22. The apparatus of claim 12, wherein making the policy decision comprises comparing the particular network resources in the request for policy authorization with network resources authorized for use by a particular application identified by the particular application context.

23. A system comprising:
means for receiving a first message from a first manager, the first message comprising a first element of a request for policy authorization, the request for policy authorization attempting to authorize use of particular network resources for a particular application context, the particular network resources comprising one or more quality-of-service (QoS) resources, access and connectivity parameters, mobility resources, accounting resources, deep-packet-inspection resources, or transcoding resources, the particular application context comprising a particular application framework;

means for, in response to the first message, establishing a policy rendezvous state at a policy manager for a policy decision on the request for policy authorization;

means for, during the policy rendezvous state, communicating to the first manager a second message indicating that the policy decision is pending, receipt of the second message at the first manager initiating one or more processes at the first manager in preparation for use of the particular network resources or application parameters for the particular application context;

means for receiving a third message from a second manager subsequent to the first message, the third message comprising a second element of the request for policy authorization, the second element completing the request for policy authorization;

means for, in response to the third second message, making the policy decision based on the first and second elements of the request for policy authorization; and means for, if the policy decision grants the request for policy authorization, generating a complete policy facet and communicating the complete policy facet to the first manager or the second manager to authorize use of the particular resources or application parameters for the particular application context.

24. One or more computer-readable non-transitory storage media embodying software that is operable when executed to:
receive a first message from a first manager, the first message comprising a first element of a request for policy authorization, the request for policy authorization attempting to authorize use of particular network resources for a particular application context, the particular network resources comprising one or more quality-of-service (QoS) resources, access and connectivity parameters, mobility resources, accounting resources, deep-packet-inspection resources, or transcoding resources, the particular application context comprising a particular application framework;

in response to the first message, establish a policy rendezvous state at a policy manager for a policy decision on the request for policy authorization;

during the policy rendezvous state, communicate to the first manager a second message indicating that the policy decision is pending, receipt of the second message at the first manager initiating one or more processes at the first manager in preparation for use of the particular network resources or application parameters for the particular application context;

receive a third message from a second manager subsequent to the first message, the third message comprising a second element of the request for policy authorization, the second element completing the request for policy authorization;

in response to the third message, make the policy decision based on the first and second elements of the request for policy authorization; and if the policy decision grants the request for policy authorization, generate a complete policy facet and communicating the complete policy facet to the first manager or the second manager to authorize use of the particular network resources or the application parameters for the particular application context.

* * * * *